United States Patent
Scheinkerman

(10) Patent No.: US 12,061,937 B2
(45) Date of Patent: Aug. 13, 2024

(54) METHODS AND APPARATUS FOR SENSOR DATA CONSISTENCY

(71) Applicant: Allegro MicroSystems, LLC, Manchester, NH (US)

(72) Inventor: Ricardo Scheinkerman, Ciudad Autonoma de Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 188 days.

(21) Appl. No.: 17/846,455

(22) Filed: Jun. 22, 2022

(65) Prior Publication Data

US 2023/0418689 A1    Dec. 28, 2023

(51) Int. Cl.
*G06F 9/52* (2006.01)
*G01D 5/14* (2006.01)

(52) U.S. Cl.
CPC ............. *G06F 9/526* (2013.01); *G01D 5/145* (2013.01)

(58) Field of Classification Search
CPC ................................. G06F 9/526; G01D 5/145
USPC ......................................................... 710/200
See application file for complete search history.

(56) References Cited

U.S. PATENT DOCUMENTS

| | | | |
|---|---|---|---|
| 5,606,707 A * | 2/1997 | Tomassi | G06T 1/20 358/448 |
| 6,173,207 B1 * | 1/2001 | Eidson | G05B 19/4185 702/187 |
| 6,288,567 B1 | 9/2001 | Fink | |
| 6,470,258 B1 * | 10/2002 | Leamy | F02N 11/00 701/100 |
| 6,968,484 B2 | 11/2005 | Hummel | |
| 7,091,876 B2 | 8/2006 | Steger | |
| 7,319,418 B2 | 1/2008 | Fink | |
| 8,122,159 B2 | 2/2012 | Monreal | |
| 8,183,982 B2 | 5/2012 | Scherr | |
| 8,519,819 B2 | 8/2013 | Scherr | |
| 8,922,331 B2 | 12/2014 | Scherr | |
| 9,172,565 B2 | 10/2015 | Cadugan et al. | |
| 9,552,315 B2 | 1/2017 | Monreal | |
| 9,634,715 B2 | 4/2017 | Scheinkerman et al. | |
| 9,760,827 B1 * | 9/2017 | Lin | G06N 3/08 |
| 9,787,495 B2 | 10/2017 | Vreeland et al. | |
| 10,271,766 B1 * | 4/2019 | Parker, Jr. | A61B 5/0833 |
| 10,747,708 B2 | 8/2020 | Kozomora et al. | |
| 11,368,533 B2 | 6/2022 | Kozomora et al. | |

(Continued)

FOREIGN PATENT DOCUMENTS

EP    1490772    12/2004

*Primary Examiner* — Paul R. Myers
(74) *Attorney, Agent, or Firm* — DALY, CROWLEY, MOFFORD & DURKEE, LLP

(57) ABSTRACT

A sensor system includes a signal sensing block including at least two sensing elements. Each of the at least two sensing elements is configured to generate an output that represents a first parameter associated with the sensor system. The sensor system also includes a data acquisition block configured to convert the outputs of the at least two sensing elements into digital data to be retrieved by a data retrieval block. The digital data is stored in one or more data registers of the data acquisition block. The sensor system also includes a data freeze block configured to cause the one or more data registers to refrain from updating with new data while the data retrieval block is retrieving the stored digital data.

15 Claims, 8 Drawing Sheets

(56) References Cited

U.S. PATENT DOCUMENTS

| | | | |
|---|---|---|---|
| 2002/0011837 A1* | 1/2002 | Sato | G01D 5/145 324/207.2 |
| 2006/0097976 A1* | 5/2006 | Lee | G06F 3/042 345/98 |
| 2009/0125278 A1* | 5/2009 | Frese | G01D 5/24414 702/187 |
| 2017/0163366 A1* | 6/2017 | Aichriedler | H04L 12/403 |
| 2019/0182415 A1* | 6/2019 | Sivan | G06F 3/013 |
| 2020/0168347 A1* | 5/2020 | Tolliver | G16Y 20/10 |
| 2020/0169284 A1* | 5/2020 | Easwaran | H03K 5/24 |
| 2022/0239462 A1 | 7/2022 | Casu et al. | |
| 2023/0125037 A1* | 4/2023 | Michenthaler | H04Q 9/04 370/252 |

* cited by examiner

METHODS AND APPARATUS FOR SENSOR DATA CONSISTENCY

FIELD

This disclosure relates generally to sensors and, more particularly to ensuring sensor data consistency.

BACKGROUND

As is known, sensors are used to perform various functions in a variety of applications. Some sensors include one or more magnetic field sensing elements, such as Hall effect elements, to sense a magnetic field associated with proximity or motion of a target object, such as a ring magnet or a ferromagnetic object in the form gear, or to sense a current, as examples. Some sensors (e.g., angle sensors) are configured to sense magnetic field strength in a plurality of axes and calculate magnetic field angle based on the sensed magnetic field strength. Data related to the sensed magnetic field strength and/or the calculated magnetic field angle can be stored in one or more data storage locations.

Sensors are often provided in the form of integrated circuits (ICs) containing one or more semiconductor die supporting sensing elements, electronic circuitry and optionally containing additional elements, such as a magnet and/or passive components, such as capacitors. Sensor integrated circuits are widely used in automobile control systems and other safety critical applications.

SUMMARY

Described herein are sensors that are configured to generate sensor outputs and store data related to the sensor outputs in one or more data registers. The stored data can be retrieved through a communication interface for further storage and/or processing. Data consistency errors can occur in some sensor systems, for example, when data sensing and acquisition activities continue while data is being retrieved through the communication interface. Data consistency errors can be minimized and/or eliminated by enabling and disabling the ability of the sensor to update the data registers. For example, while data is being retrieved from the data registers, the data registers can be controlled to prevent updating with new data until the retrieval has completed. In this way, data consistency can be maintained by the sensor system.

According to the disclosure, in an aspect, a sensor system includes a signal sensing block including at least two sensing elements. Each of the at least two sensing elements is configured to generate an output that represents a first parameter associated with the sensor system. The sensor system also includes a data acquisition block configured to convert the outputs of the at least two sensing elements into digital data to be retrieved by a data retrieval block. The digital data is stored in one or more data registers of the data acquisition block. The sensor system also includes a data freeze block configured to cause the one or more data registers to refrain from updating with new data while the data retrieval block is retrieving the stored digital data.

Features may include one or more of the following individually or in combination with other features.

In some implementations, a combination of the outputs of the at least two sensing elements represents a second parameter associated with the sensor system, and the data acquisition block is further configured to convert the combination of the outputs of the at least two sensing elements into the digital data.

In some implementations, the sensor system includes a data ready block configured to identify when the digital data stored in the one or more data registers is available for retrieval by the data retrieval block.

In some implementations, the output of each of the at least two sensing elements represents the first parameter at a particular time, and the combination of the outputs from the at least two sensing elements represents the second parameter at the particular time.

In some implementations, the data retrieval block is configured to retrieve the digital data with a serial communication interface.

In some implementations, the signal sensing block, the data acquisition block, and the data freeze block are included as part of the same integrated circuit package.

In some implementations, the data ready block is configured to identify when the digital data is available for retrieval based on a signal received from the data acquisition block, and the signal causes a flag of the data ready block to be asserted.

In some implementations, the data retrieval block is configured to initiate retrieval of the digital data based in part on identifying that the flag is asserted.

In some implementations, the data freeze block is configured to monitor for initiation of retrieval of the digital data, and in response to identifying that the retrieval of the digital data has been initiated, assert a signal to the data acquisition block causing the one or more data registers to refrain from updating.

In some implementations, the data ready block is configured to de-assert the flag in response to the data retrieval block completing retrieval of the digital data stored in the one or more data registers.

In some implementations, the data freeze block is configured to de-assert the signal to the data acquisition block, to re-enable updating of the one or more data registers, in response to the flag being de-asserted.

In some implementations, the data retrieval block is part of an Engine Control Unit (ECU).

In some implementations, each of the at least two sensing elements of the signal sensing block includes at least one magnetic field sensing element for sensing a magnetic field affected by movement of a proximate object.

In some implementations, the first parameter includes a strength of a magnetic field in a respective axis and the second parameter includes an angle of the magnetic field.

In another aspect, a method includes generating, by each of at least two sensing elements, an output that represents a first parameter, converting the outputs of the at least two sensing elements into digital data, and storing the digital data in one or more data registers, and causing the one or more data registers to refrain from updating with new data while the stored digital data is being retrieved.

Features may include one or more of the following individually or in combination with other features.

In some implementations, the method includes converting a combination of the outputs of the at least two sensing elements into the digital data. The combination of the outputs of the at least two sensing elements represents a second parameter.

In some implementations, the method includes identifying when the digital data stored in the one or more data registers is available for retrieval.

In some implementations, the digital data stored in the one or more data registers is identified as being available for retrieval based on a received signal, and the received signal causes a flag to be asserted.

In some implementations, the method includes initiating retrieval of the digital data based in part on identifying that the flag is asserted.

In some implementations, the method includes monitoring for initiation of retrieval of the digital data, and in response to identifying that the retrieval of the digital data has been initiated, asserting a freeze signal causing the one or more data registers to refrain from updating.

In some implementations, the method includes de-asserting the flag in response to the retrieval of the digital data stored in the one or more data registers being completed.

In some implementations, the method includes de-asserting the freeze signal, to re-enable updating of the one or more data registers, in response to the flag being de-asserted.

In some implementations, the first parameter includes a strength of a magnetic field in a respective axis and the second parameter includes an angle of the magnetic field.

In another aspect, a sensor system includes means for generating two or more outputs that each represents a first parameter associated with the sensor system. The sensor system also includes means for converting the two or more outputs into digital data and storing the digital data in a storage location. The sensor system also includes means for causing the storage location to refrain from updating with new data while the stored digital data is being retrieved.

Features may include one or more of the following individually or in combination with other features.

In some implementations, the sensor system includes means for converting a combination of the two or more outputs into the digital data. The combination of the two or more outputs represents a second parameter associated with the sensor system.

In some implementations, the sensor system includes means for identifying when the digital data stored in the storage location is available for retrieval.

In some implementations, the first parameter includes a strength of a magnetic field in a respective axis and the second parameter includes an angle of the magnetic field.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
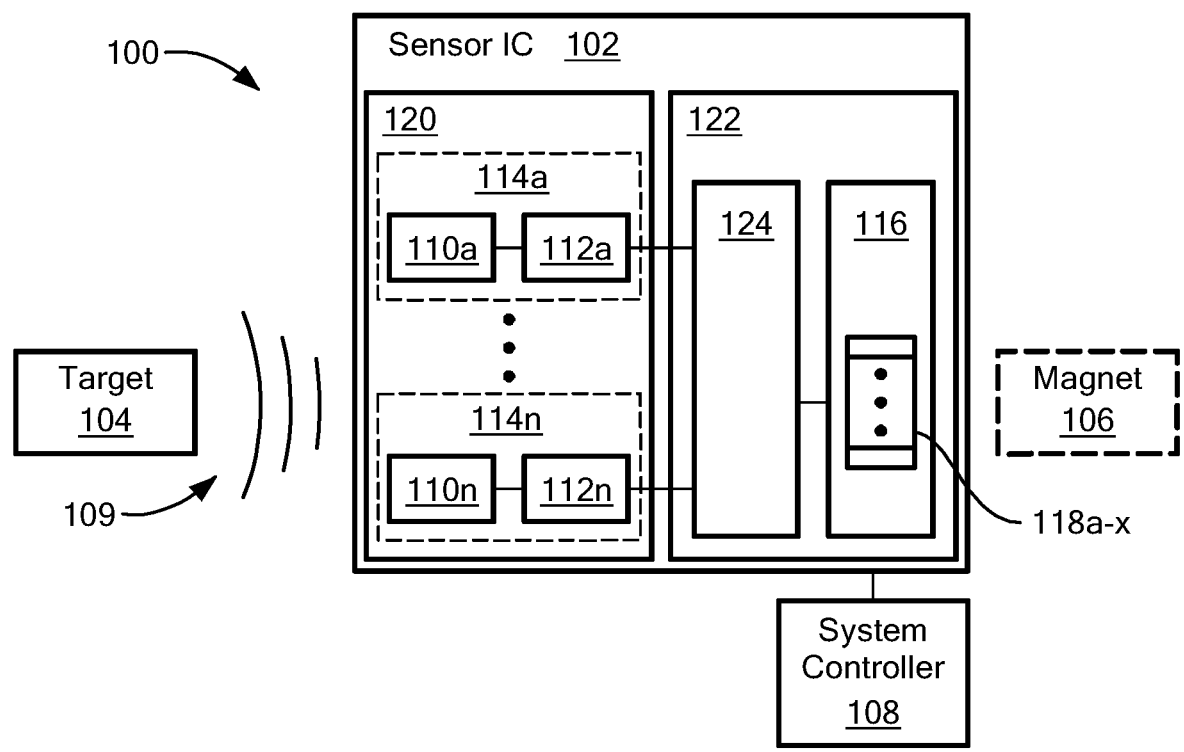
FIG. 1 is a block diagram of a prior art sensor system.

Referring to FIG. 1, a prior art sensor system 100 for sensing information related to a target 104 includes at least a sensor IC 102 and a system controller 108. In this example, the sensor IC 102 is a magnetic field sensor configured to sense a magnetic field 109 affected by the target 104. In general, the sensor IC 102 is configured to sense one or more characteristics of the magnetic field 109 and provide outputs based on the sensed characteristics. The outputs can be indicative of a position, orientation, and/or motion of the target 104.

In some implementations, the sensor system 100 optionally includes a magnet 106 that is configured to generate a magnetic field. The magnet 106 may be a back-biased magnet positioned near the sensor IC 102. The magnetic field generated by the magnet 106 can be affected (e.g., modified) by the target 104. For example, the target 104 may be made from a ferromagnetic material that is configured to modify the magnetic field generated by the magnet 106, and the sensor IC 102 can be configured to sense one or more characteristics of the modified magnetic field 109 to determine information about the target 104.

In some implementations, the target 104 itself may generate the magnetic field 109. For example, the target 104 may be made from a magnetic material that generates the magnetic field 109. Characteristics of the magnetic field 109 generated by the target 104 can be based on the position, orientation, and/or motion of the target 104. As the target 104 moves, the magnetic field 109 changes, and the sensor IC 102 can sense characteristics of the magnetic field 109 to determine information about the target 104. In some implementations, the target 104 is a ring magnet that includes alternating north and south poles.

The sensor IC 102 includes a signal sensing block 120 that includes at least two sensing elements 110a-n. Each of the at least two sensing elements 110a-n is configured to sense one or more characteristics of the magnetic field 109 and generate magnetic field signals based on the sensed characteristics. The magnetic field signals from the at least two sensing elements 110a-n can undergo front end processing by corresponding front end processing components 112a-n. The front end processing components 112a-n can include one or more amplifiers for amplifying the magnetic field signals. Example front end processing can include automatic gain control and/or offset adjustment. In some examples, the magnetic field signals are analog signals, and the front end processing components 112a-n are configured to process the analog magnetic field signals before they are converted to digital data. The at least two sensing elements 110a-n, the front end processing components 112a-n, and their corresponding magnetic field signals and processing paths can be referred to as belonging to sensor channels 114a-n, respectively.

The sensor IC 102 includes a data acquisition block 122 that is configured to receive, process, and store data that is based on the magnetic field signals received from the signal sensing block 120. As described above, in some implementations, the magnetic field signals may undergo front end processing before being provided to the data acquisition block 122. The data acquisition block 122 includes an acquisition engine 124 that is configured to receive the magnetic field signals from the signal sensing block 120 and convert the magnetic field signals into digital data. The digital data can be processed by a processor 116 and stored in a plurality of data registers 118a-x. The digital data stored in the data registers 118a-x can represent characteristics of the magnetic field 109 sensed by the sensor IC 102. For example, the digital data can include information related to magnetic field strengths (e.g., in various axes) and magnetic field angle, to name a few. Because the sensed characteristics of the magnetic field 109 are based on and indicative of a position, orientation, and/or motion of the target 104, the digital data stored in the data registers 118a-x can be used to determine such information related to the target 104 at various times.

The digital data stored in the data registers 118a-x can be associated with a particular time. The particular time corresponds to a time at which the magnetic field 109 is sensed by the at least two sensing elements 110a-n. For example, at a time $t_1$, or at $t=t_1$, the target 104 may be in a first position and/or orientation, and a magnetic field having particular characteristics indicative of the first position and/or orientation of the target 104 can be sensed by the sensor IC 102. The data registers 118a-x can store digital data corresponding to the characteristics of the magnetic field 109 sensed by the sensor IC 102 at $t=t_1$, and such digital data can be associated with $t=t_1$. At a time $t_2$, or at $t=t_2$, the target 104 may be in a second position and/or orientation, and a magnetic field having particular characteristics indicative of the second position and/or orientation of the target 104 can be sensed by the sensor IC 102. The data registers 118a-x can store digital data corresponding to the characteristics of the magnetic field 109 sensed by the sensor IC 102 at $t=t_2$, and such digital data can be associated with $t=t_2$. Digital data corresponding to a target characteristic sensed at a particular time is sometimes referred to herein as representing a "snapshot" or "status" of the sensor system 100 at the particular time. Thus, the sensor system 100 has a first snapshot with corresponding digital data at $t=t_1$, and the sensor system 100 has a second snapshot with corresponding digital data at $t=t_2$.

The system controller 108 is configured to retrieve the digital data stored in the data registers 118a-x for further storing and/or processing. In some implementations, the digital data is retrieved through a serial communication interface, such as Serial Parallel Interface (SPI) or I²C as examples. During retrieval of the digital data corresponding to a snapshot, digital data corresponding to a subsequent snapshot of the sensor system 100 may be acquired and stored. For example, while the system controller 108 is retrieving the digital data corresponding to the first system snapshot from the data registers 118a-x, the target 104 may change position and/or orientation (e.g., to a position and/or orientation that corresponds to the second system snapshot). The sensor IC 102 can continue to sense one or more characteristics of the magnetic field 109 while the system controller 108 is still retrieving the digital data corresponding to the first system snapshot from the data registers 118a-x. Thus, the digital data stored in the data registers 118a-x (e.g., which previously corresponded to the first system snapshot) may be replaced with new digital data that corresponds to the second system snapshot before retrieval of the digital data corresponding to the first system snapshot has completed. This can lead to digital data from different system snapshots being intermixed in the data retrieved by the system controller 108, which is sometimes referred to herein as presenting a data consistency error.

Figure 2:
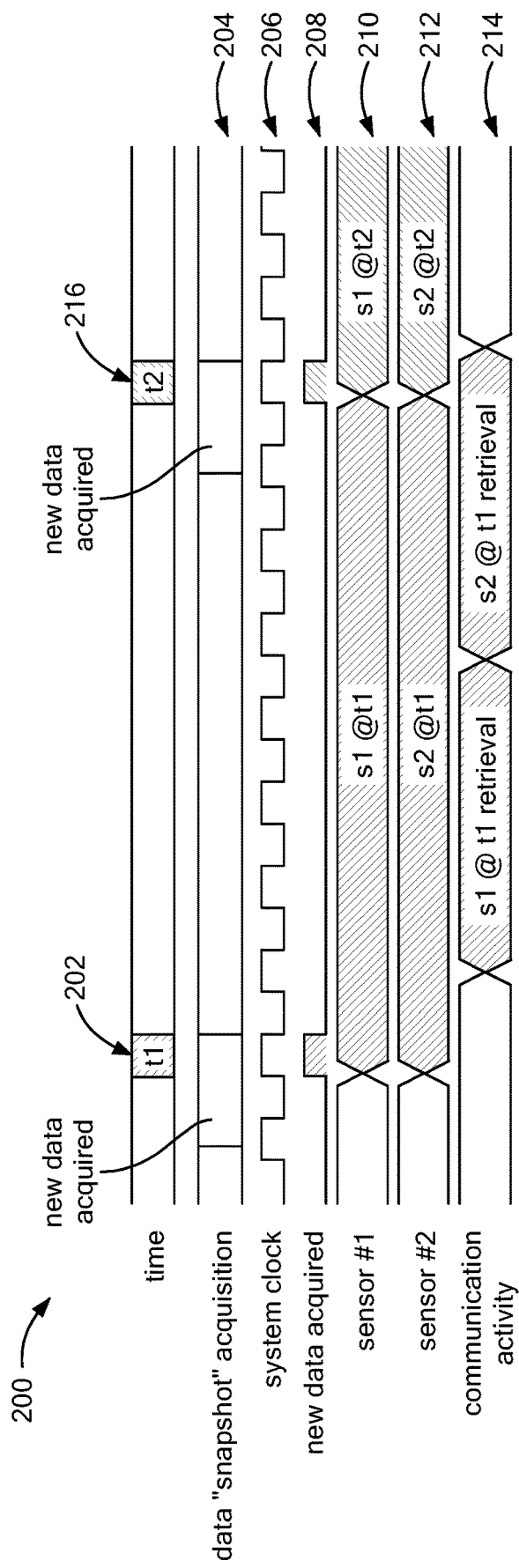
FIG. 2 shows an example timing diagram associated with the prior art sensor system of FIG. 1 illustrating data consistency without errors.

FIG. 2 shows an example timing diagram 200 associated with the sensor system 100 of FIG. 1 in which a data consistency error is not present. The timing diagram 200 includes representations of data snapshot acquisitions 204 at a first time $t=t_1$ 202 and at a second time $t=t_2$ 216. The timing diagram 200 includes a representation of a system clock 206 according to which the sensor system 100 can operate. The timing diagram 200 includes a representation of a new data signal 208 that indicates when a data snapshot acquisition 204 has completed, representations of data sensed by a first sensor 210 and data sensed by a second sensor 212 at various times, and a representation of communication activity 214 of the sensor system 100 (e.g., serial data retrieval by the system controller 108). The first and second sensors generating sensor data 210, 212, respectively, can be sensor channels 114a, 114n of FIG. 1, for example.

At the first time $t=t_1$ 202, data corresponding to a first system snapshot is sensed by the sensor system 100. For example, beginning at the first time $t=t_1$ 202 and until the second time $t=t_2$ 216, data sensed by the first sensor 210 and data sensed by the second sensor 212 correspond to the first system snapshot. The sensed data can be converted to digital data and stored in the one or more data registers 118a-x, from where it can be retrieved by the system controller 108. The communication activity 214 indicates that data related to the first sensor at the first time $t=t_1$ is retrieved, and data related to the second sensor at the first time $t=t_1$ is subsequently retrieved.

In this example, the communication activity 214 indicates that the data related to the first sensor at the first time $t=t_1$ and the data related to the second sensor at the first time $t=t_1$ is retrieved before data corresponding to the second system snapshot is sensed (e.g., at the second time $t=t_2$ 216) by the sensor system 100. Therefore, there is no intermixing of digital data from different system snapshots in the communication activity 214, and thus a data consistency error is not present.

Figure 3:
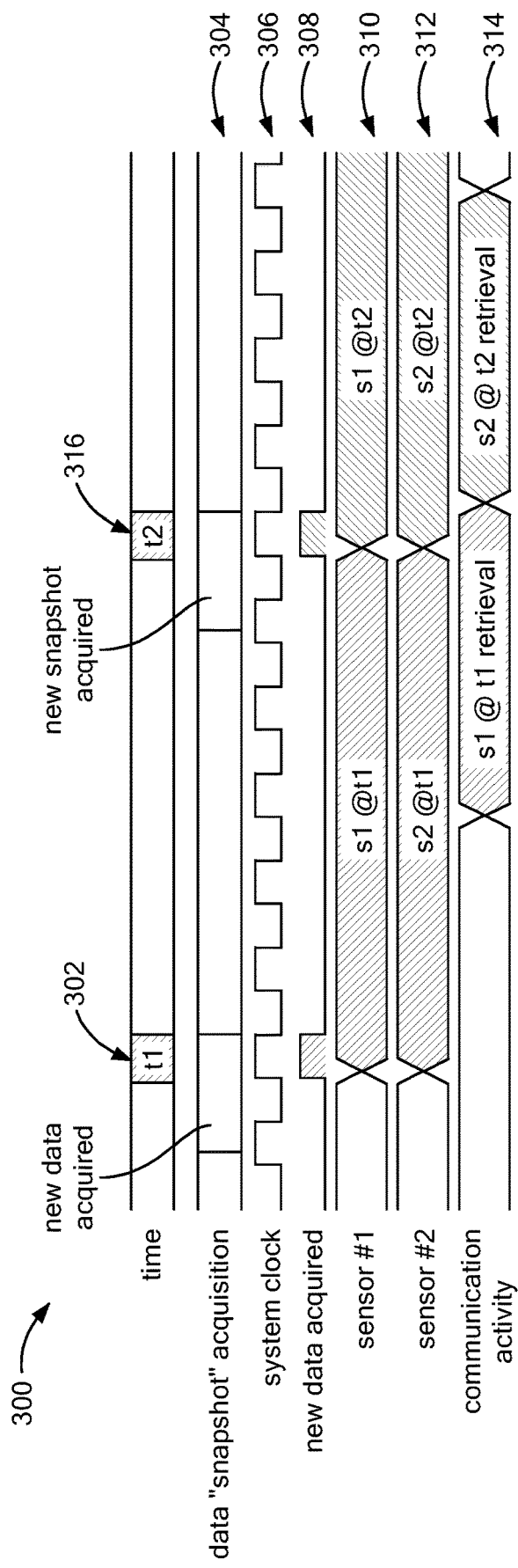
FIG. 3 shows an example timing diagram associated with the prior art sensor system of FIG. 1 illustrating a data consistency error.

FIG. 3 shows an example timing diagram 300 associated with the sensor system 100 of FIG. 1 in which a data consistency error is present. The timing diagram 300 includes representations of data snapshot acquisitions 304 at a first time $t=t_1$ 302 and at a second time $t=t_2$ 316. The timing diagram 300 includes a representation of a system clock 306 according to which the sensor system 100 can operate. The timing diagram 300 includes a representation of a new data signal 308 that indicates when a data snapshot acquisition 304 has completed, representations of data sensed by a first sensor 310 and data sensed by a second sensor 312 at various times, and a representation of communication activity 314 of the sensor system 100 (e.g., serial data retrieval by the system controller 108). The first and second sensors generating sensor data 310, 312, respectively, can be sensor channels 114a, 114n of FIG. 1, for example.

At the first time $t=t_1$ 302, data corresponding to a first system snapshot is sensed by the sensor system 100. For example, beginning at the first time $t=t_1$ 302 and until the second time $t=t_2$ 316, data sensed by the first sensor 310 and data sensed by the second sensor 312 correspond to the first system snapshot. The sensed data can be converted to digital data and stored in the data registers 118a-x, from where it can be retrieved by the system controller 108. The communication activity 314 indicates that data related to the first sensor at the first time $t=t_1$ is retrieved first.

Comparing the times at which the data snapshot acquisitions 204, 304 occur in FIGS. 2 and 3, it is noted that the second time $t=t_2$ 316 of FIG. 3 occurs earlier than the second time $t=t_2$ 216 of FIG. 2 occurs. In other words, the amount of time between data snapshot acquisitions 204, 304 is smaller in the timing diagram 300 of FIG. 3. Referring to the communication activity 214, 314, it is also noted that data from the first sensor is retrieved sooner after the first time $t=t_1$ 202 in FIG. 2, than data from the first sensor is retrieved after the first time $t=t_1$ 302 in FIG. 3. As such, in this example, the communication activity 314 indicates that data related to the first sensor at the first time $t=t_1$ is retrieved before data corresponding to the second system snapshot is sensed (e.g., at the second time $t=t_2$ 316) by the sensor system 100, but there is not enough time to retrieve data related to the second sensor at the first time $t=t_1$ before the data corresponding to the second system snapshot is sensed by the sensor system 100. In other words, the new data snapshot acquisition occurs before the retrieval of digital data related to the first system snapshot is completed. As a result, as indicated by the communication activity 314, the next piece of data retrieved is data related to the second sensor at the second time $t=t_2$. Because the data retrieval includes data intermixed from different system snapshots (i.e., data sensed at times $t_1$ and $t_2$), a data consistency error is present.

Figure 4:
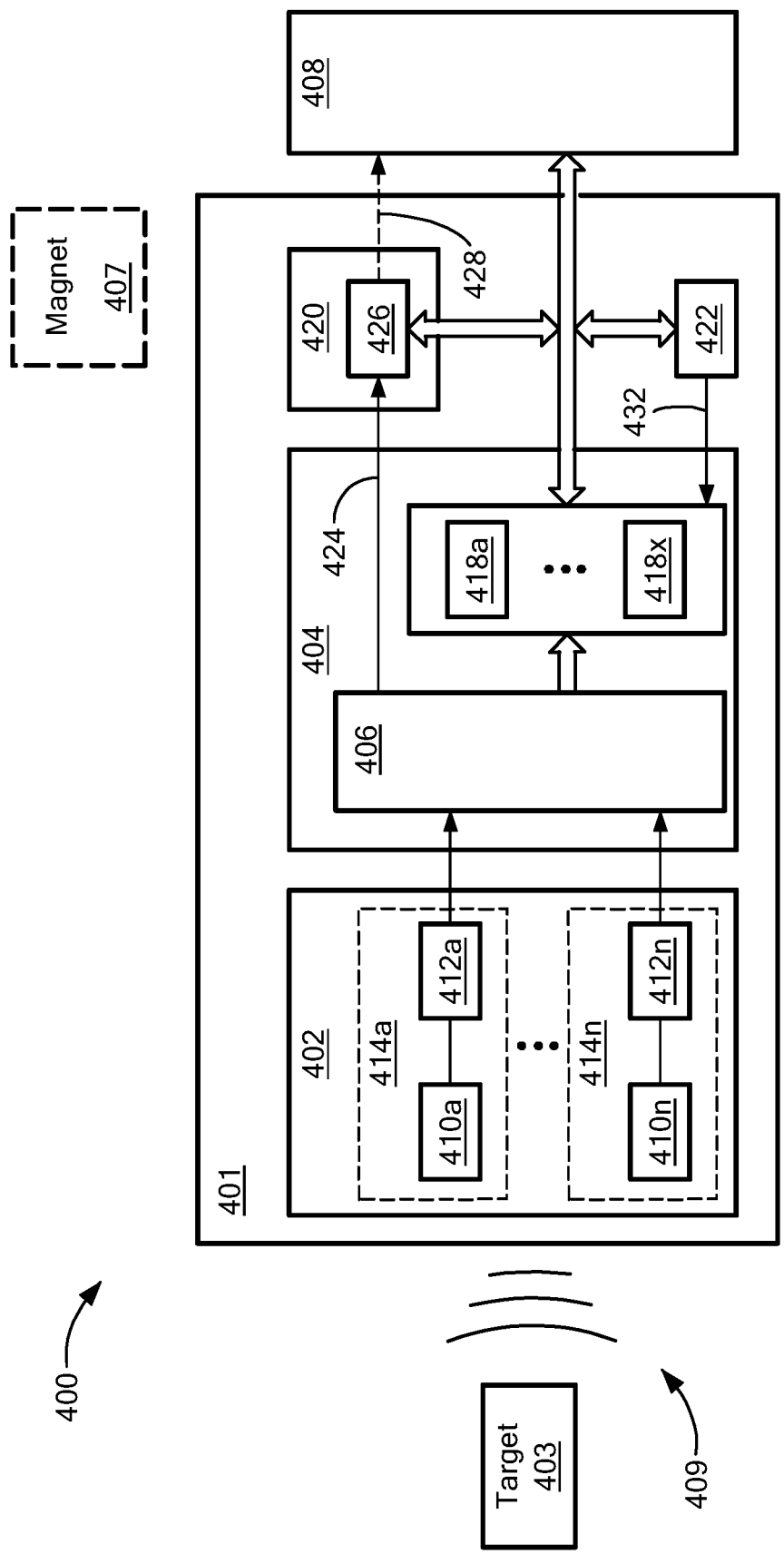
FIG. 4 is a block diagram of an example sensor system with data consistency protection according to the disclosure.

FIG. 4 shows an example sensor system 400 with data consistency protection. The sensor system 400 is configured to sense information related to a target 403. The sensor system 400 includes a sensor IC 401 and a data retrieval block 408. In this example, the sensor IC 401 is a magnetic field sensor configured to sense a magnetic field 409 affected by the target 403. In general, the sensor IC 401 is configured to sense one or more characteristics of the magnetic field 409 and provide outputs based on the sensed characteristics. The outputs can be indicative of a position, orientation, and/or motion of the target 403.

In some implementations, the sensor system 400 optionally includes a magnet 407 that is configured to generate a magnetic field. The magnet 407 may be a back-biased magnet positioned near the sensor IC 401. The magnetic field generated by the magnet 407 can be affected (e.g., modified) by the target 403. For example, the target 403 may be made from a ferromagnetic material that is configured to modify the magnetic field generated by the magnet 407, and the sensor IC 401 can be configured to sense one or more characteristics of the modified magnetic field 409 to determine information about the target 403.

In some implementations, the target 403 itself may generate the magnetic field 409. For example, the target 403 may be made from a magnetic material that generates the magnetic field 409. Characteristics of the magnetic field 409 generated by the target 403 can be based on the position, orientation, and/or motion of the target 403. As the target 403 moves, the magnetic field 409 changes, and the sensor IC 401 can sense characteristics of the magnetic field 409 to determine information about the target 403. In some implementations, the target 403 is a ring magnet that includes alternating north and south poles.

The sensor IC 401 includes a signal sensing block 402 that includes at least two sensing elements 410a-n. Each of the at least two sensing elements 410a-n is configured to generate an output that represents a first parameter associated with the sensor system 400. In some implementations, each of the at least two sensing elements 410a-n is configured to sense one or more characteristics of the magnetic field 409 and generate magnetic field signals based on the sensed characteristics. The magnetic field signals can be indicative of a position, orientation, and/or motion of a proximate object, such as the target 403. The magnetic field signals from the at least two sensing elements 410a-n can undergo front end processing by corresponding front end processing components 412a-n. The front end processing components 412a-n can include one or more amplifiers for amplifying the magnetic field signals. Example front end processing can include automatic gain control and/or offset adjustment. In some examples, the magnetic field signals are analog signals, and the front end processing components 412a-n are configured to process the analog magnetic field signals before they are converted to digital data. The at least two sensing elements 410a-n, the front end processing components 412a-n, and their corresponding magnetic field signals and processing paths can be referred to as belonging to sensor channels 414a-n, respectively.

The sensor IC 401 includes a data acquisition block 404 that is configured to convert the outputs of the at least two sensing elements 410a-n, or channels 414a-n, into digital data. In particular, the data acquisition block 404 includes an acquisition engine 406 that is configured to receive the outputs from the at least two sensing elements 410a-n of the signal sensing block 402, or channels 414a-n, and convert the outputs into digital data. The digital data is stored in one or more data registers 418a-x of the data acquisition block 404. In the case where the outputs from the at least two sensing elements 410a-n are magnetic field signals, the digital data stored in the data registers 418a-x can represent characteristics of the magnetic field 409 sensed by the sensor IC 401. For example, the digital data can include information related to magnetic field strengths (e.g., in various axes) and magnetic field angle, to name a few. Because the sensed characteristics of the magnetic field 409 are based on and indicative of a position, orientation, and/or motion of the target 403, the digital data stored in the data registers 418a-x can be used to determine such information related to the target 403 at various times.

The outputs of each of the at least two sensing elements 410a-n and the corresponding digital data stored in the one or more data registers 418a-x can be associated with a particular time. Continuing with the magnetic sensor example, the particular time corresponds to a time at which the magnetic field 409 is sensed by the at least two sensing elements 410a-n. For example, at a time $t_1$, or at $t=t_1$, the target 403 may be in a first position and/or orientation, and a magnetic field having particular characteristics indicative of the first position and/or orientation of the target 403 can be sensed by the sensor IC 401. In some implementations, the target 403 may be a gear. The data registers 418a-x can store digital data corresponding to the characteristics of the magnetic field 409 sensed by the sensor IC 401 at $t=t_1$, and such digital data can be associated with $t=t_1$. At a time $t_2$, or at $t=t_2$, the target 403 may be in a second position and/or orientation, and a magnetic field having particular characteristics indicative of the second position and/or orientation of the target 403 can be sensed by the sensor IC 401. The data registers 418a-n can store digital data corresponding to the characteristics of the magnetic field 409 sensed by the sensor IC 401 at $t=t_2$, and such digital data can be associated with $t=t_2$. Digital data corresponding to a target characteristic sensed at a particular time is sometimes referred to herein as representing a "snapshot" or "status" of the sensor system 400 at the particular time. Thus, the sensor system 400 has a first snapshot with corresponding digital data at $t=t_1$, and the sensor system 400 has a second snapshot with corresponding digital data at $t=t_2$.

In some implementations, a combination of the outputs of the at least two sensing elements 410a-n represents a second parameter associated with the sensor system 400. The acquisition engine 406 can be configured to process the outputs of the at least two sensing elements 410a-n to provide the combination. In some examples, the outputs of the at least two sensing elements 410a-n can be processed according to one or more functions to provide the combination. The data acquisition block 404 is configured to convert the combination of the outputs of the at least two sensing elements into digital data and store the digital data in the one or more data registers 418a-x. The first parameter associated with the sensor system 400 may be a strength of a magnetic field in a respective axis, and the second parameter associated with the sensor system 400 may be an angle of the magnetic field. In some implementations, the angle of the magnetic field may be determined using a coordinate rotation digital computer (CORDIC) processor. For example, the acquisition engine 406 may include a CORDIC processor that computes the arctangent of two orthogonal magnetic field components to determine the angle of the magnetic field 409.

The sensor IC 401 includes a data ready block 420 that is configured to identify when the digital data stored in the one or more data registers 418a-x is available for retrieval by the data retrieval block 408. In some implementations, the data retrieval block 408 may be a system controller, such as an Engine Control Unit (ECU). The data ready block 420 is configured to identify when digital data is available for retrieval based on a signal 424 (e.g., an acquisition complete signal) received from the data acquisition block 404 (e.g., from the acquisition engine 406). The signal 424 can be sent when all data (or, e.g., all data of interest) related to a snapshot associated with the sensor system 400 is acquired and stored in the one or more data registers 418a-x, ready to be retrieved by the data retrieval block 408. The signal 424 can cause a flag 426 of the data ready block 420 to be asserted, or set. The data retrieval block 408 can initiate retrieval of the digital data based in part on identifying that the flag 426 is asserted. The flag 426 can be polled by the data retrieval block 408 to determine when the data related to the snapshot is available for retrieval. In some implementations, the data ready block 420 may optionally be configured to send an interrupt signal to the data retrieval block 408 to alert that data related to the snapshot is available for retrieval (e.g., instead of or in addition to the polling). Retrieval of the digital data can be initiated by the data retrieval block 408 sending a read command to the one or more data registers 418a-x. In some implementations, the digital data is retrieved by the data retrieval block 408 through a serial communication interface, such as Serial Parallel Interface (SPI) or FC as examples.

The sensor IC 401 includes a data freeze block 422 that is configured to cause the one or more data registers 418a-x to refrain from updating with new data while the data retrieval block 408 is retrieving the stored digital data. For example, digital data corresponding to a first system snapshot may be stored in the one or more data registers 418a-x, and the data freeze block 422 can ensure that the one or more data register 418a-x are frozen (e.g., prevented from updating with new data) until all data of interest related to the first system snapshot is retrieved by the data retrieval block 408. The data freeze block 422 is configured to monitor for initiation of retrieval of the digital data by the data retrieval block 408, and in response to identifying that the retrieval of the digital data has been initiated, assert a signal 432 (e.g., a data register freeze signal) causing the one or more data registers 418a-x to refrain from updating. In particular, the one or more data registers 418a-x are frozen in a way that prevents any new updates from the signal sensing block 402 from overwriting the first system snapshot data stored in the one or more data registers 418a-x. Thus, the one or more data registers 418a-x that are frozen can be those that are storing digital data related to the first system snapshot. In some implementations, the data freeze block 422 can monitor a read command sent from the data retrieval block 408 to the one or more data registers 418a-x to determine if a data acquisition has been initiated. Once the one or more data registers 418a-x are frozen, retrieval of the digital data by the data retrieval block 408 can continue until all digital data corresponding to the first system snapshot of interest is retrieved. The signal sensing block 402, the data acquisition block 404, and the data freeze block 422 can be included as part of the same integrated circuit package (e.g., part of the same sensor IC 401), as illustrated in FIG. 4. However, in some implementations, the signal sensing block 402 may be provided separately from the sensor IC 401 (e.g., in inductive sensing applications).

The data ready block 420 is configured to de-assert or clear the flag 426 in response to the data retrieval block 408 completing retrieval of the digital data stored in the one or more data registers 418a-x. In some examples, the data retrieval block 408 can execute a write to the data ready block 420 to cause the flag 426 to be de-asserted. The data freeze block 422 is configured to de-assert the signal 432, to re-enable updating of the one or more data registers 418a-x in response to the flag 426 being de-asserted. In some implementations, the data freeze block 422 can monitor the flag 426 to determine when retrieval of the digital data has completed. Once the one or more data registers 418a-x are unfrozen, the sensor system 400 can proceed to acquire and store the next system snapshot.

Figure 5:
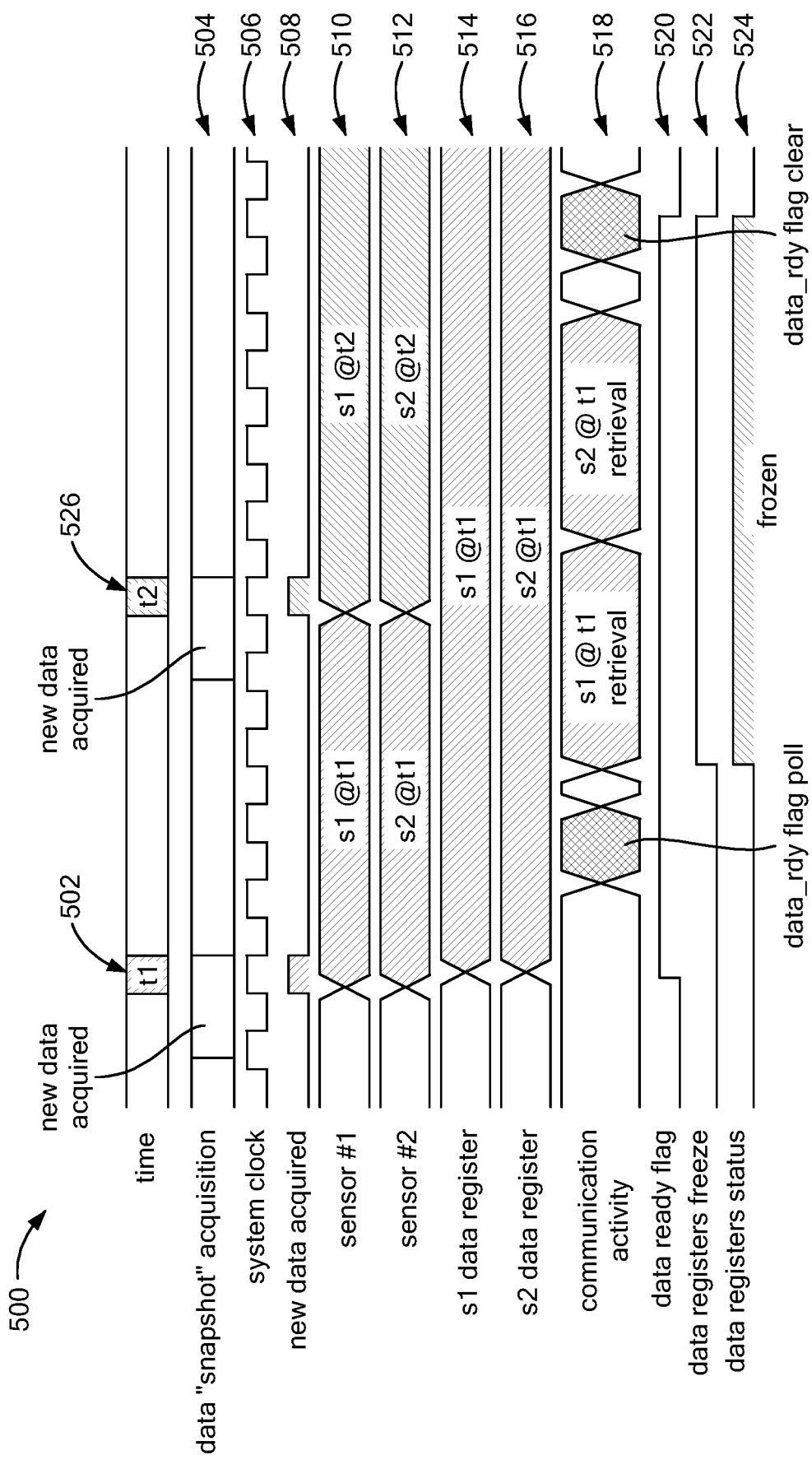
FIGS. 5 and 6 show example timing diagrams associated with the sensor system of FIG. 4 illustrating data consistency without errors.

FIG. 5 shows an example timing diagram 500 associated with the sensor system 400 of FIG. 4 in which a data consistency error is not present. The timing diagram 500 includes representations of data snapshot acquisitions 504 at a first time $t=t_1$ 502 and at a second time $t=t_2$ 526. The timing diagram 500 includes a representation of a system clock 506 according to which the sensor system 400 can operate. The timing diagram 500 includes a representation of an acquisition complete signal 508 (e.g., the signal 424 of FIG. 4) that indicates when a data snapshot acquisition 504 has completed, and representations of data sensed by a first sensor 510 and data sensed by a second sensor 512 at various times. The timing diagram 500 includes a representation of the data stored in a first data register 514 (e.g., a data register corresponding to the first sensor), and a representation of the data stored in a second data register 516 (e.g., a data register corresponding to the second sensor). The timing diagram 500 includes a representation of communication activity 518 of the sensor system 400. The communication activity 518 represents the data retrieved by the data retrieval block 408. In this example, the data retrieval block 408 is configured to retrieve the digital data with a serial communication interface. The timing diagram 500 includes a representation of a data ready flag 520 (e.g., the flag 426 of the data ready block 420 of FIG. 4), a representation of a data registers freeze signal 522 (e.g., the signal 432 of FIG. 4), and a representation of a status of the data registers 524. The first and second sensors generating sensor data 510, 512, respectively, can be sensor channels 414a, 414n of FIG. 4, for example.

At the first time $t=t_1$ 502, data corresponding to a first system snapshot is sensed by the sensor system 400. For example, beginning at the first time $t=t_1$ 502 and until the second time $t=t_2$ 526, data sensed by the first sensor 510 and data sensed by the second sensor 512 correspond to the first system snapshot. The sensed data can be converted to digital data and stored in the one or more data registers 418a-x, from where it can be retrieved by the data retrieval block 408. Once the data corresponding to the first system snapshot has been acquired, an acquisition complete signal 508 is issued. For example, the data acquisition block 404 (e.g., the acquisition engine 406) is configured to send the signal 424 to indicate that the data snapshot acquisition 504 corresponding to a first system snapshot has completed. The signal 424 is sent to the data ready block 420, and in response to receiving the signal 424, the flag 426 of the data ready block 420 is asserted, as indicated by the representation of the data ready flag 520.

The data retrieval block 408 can initiate retrieval of the digital data based in part on identifying that the flag 426 is asserted. For example, retrieval of the digital data can be initiated once the flag 426 is asserted. As indicated by the communication activity 518, the data retrieval block 408 can poll the flag 426 to determine when data related to the snapshot is available for retrieval, and because the flag 426 is asserted, retrieval of the digital data can be initiated. In some implementations, the data retrieval block 408 may issue a read transaction to the data acquisition block 404 when retrieval of the digital data is initiated. First, data related to the first sensor at the first time $t=t_1$ is retrieved. Once retrieval of the digital data commences, the one or more data register 418a-x are frozen. Referring to the representation of the data registers freeze signal 522, the initiation of data retrieval by the data retrieval block 408 causes the freeze signal 432 to be asserted, which in turn causes the one or more data registers 418a-x to be frozen, as indicated by the representations of the data stored in the first and second data registers 514, 516.

At the second time $t=t_2$ 526, data related to the next system snapshot is acquired. Referring to the representations of the data sensed by the first and second sensors 510, 512, once the new data is acquired, the first and second sensors begin sensing data corresponding to the next system snapshot. However, because the one or more data registers 418a-x are still frozen, the retrieval of data corresponding to the first system snapshot by the data retrieval block 408 can continue without the intermixing of data related to the next system snapshot. In particular, after the data related to the first sensor at the first time $t=t_1$ is retrieved, the representation of the communication activity 518 indicates that data related to the second sensor at the first time $t=t_1$ is subsequently retrieved. The data related to the first system snapshot is kept intact even though the first and second sensors began sensing new data at the second time $t=t_2$ 526. Because the one or more data registers 418a-x are frozen, as indicated by the representations of the data stored in the first and second data registers 514, 516, the new snapshot does not overwrite the previous one, and in this way the data retrieval can be completed without data consistency errors (i.e., without the intermixing of data from different system snapshots sensed at different times). The representation of the communication activity 518 illustrates one example of the order in which data can be retrieved, but it should be understood that other orders are also possible. For example, data related to the second sensor at the first time $t=t_1$ may be retrieved before data related to the first sensor at the first time $t=t_1$ is retrieved.

Once data retrieval of the data related to the first system snapshot is completed, the data ready block 420 is configured to de-assert (e.g., clear) the flag 426, as indicated by the representation of the data ready flag 520. As indicated by the representation of the communication activity 518, the data retrieval block 408 can issue a command (e.g., a data ready flag clear) to the data ready block 420, such as a write command, to cause the flag 426 to be de-asserted after data retrieval has completed. The data freeze block 422 can monitor the flag 426, and in response to the flag 426 being de-asserted, the data freeze block 422 is configured to de-assert the signal 432 to the data acquisition block 404, as indicated by the representation of the data registers freeze signal 522, thereby re-enabling updating of the one or more data registers 418a-x. Once the one or more data registers 418a-x are unfrozen, as indicated by the representation of the status of the one or more data registers 524, the sensor system 400 can proceed to acquire and store the next system snapshot.

Figure 6:
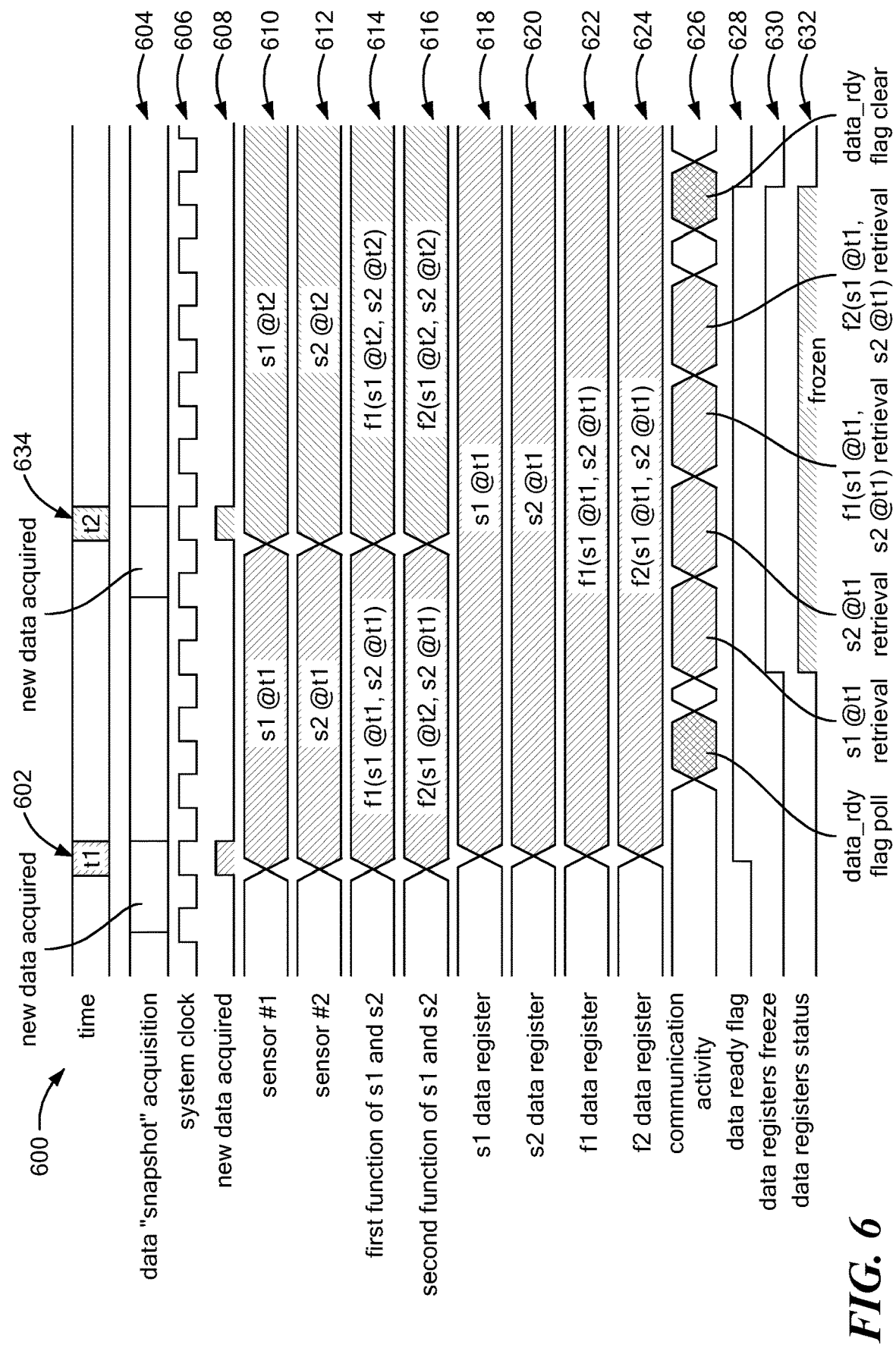

FIG. 6 shows another example timing diagram 600 associated with the sensor system 400 of FIG. 4 in which a data consistency error is not present. The timing diagram 600 is similar to the timing diagram 500 of FIG. 5, except in the example illustrated in FIG. 6, functions are performed on outputs of the at least two sensing elements 410a-n (or, e.g., on the outputs of the corresponding front end processing components 412a-n) to yield additional combination, or function data to be stored in the one or more data registers 418a-x.

The timing diagram 600 includes representations of data snapshot acquisitions 604 at a first time $t=t_1$ 602 and at a second time $t=t_2$ 634. The timing diagram 600 includes a representation of a system clock 606 according to which the sensor system 400 can operate. The timing diagram 600 includes a representation of an acquisition complete signal 508 (e.g., the signal 424 of FIG. 4) that indicates when a data snapshot acquisition 604 has completed, and representations of data sensed by a first sensor 610 and data sensed by a second sensor 612 at various times. The timing diagram 600 also includes representations of functions of the data collected by the first sensor and the second sensor. In particular, the timing diagram 600 includes a representation of data based on a first function of the first sensor and the second sensor 614, and a representation of data based on a second function of the first sensor and the second sensor 616. As described above, a combination of the outputs of the at least two sensing elements 410a-n can represent a second parameter associated with the sensor system 400, and the data acquisition block 404 can be configured to convert the combination of the outputs of the at least two sensing elements 410a-n into the digital data stored in the one or more data registers 418a-x.

The timing diagram 600 includes a representation of the data stored in a first data register 618 (e.g., a data register corresponding to the first sensor), a representation of the data stored in a second data register 620 (e.g., a data register corresponding to the second sensor), a representation of the data stored in a third data register 622 (e.g., a data register corresponding to the first function), and a representation of the data stored in a fourth data register 624 (e.g., a data register corresponding to the second function). The timing diagram 600 includes a representation of communication activity 626 of the sensor system 400. The communication activity 626 represents the data retrieved by the data retrieval block 408. In this example, the data retrieval block 408 is configured to retrieve the digital data with a serial communication interface. The timing diagram 600 includes a representation of a data ready flag 628 (e.g., the flag 426 of the data ready block 420 of FIG. 4), a representation of a data registers freeze signal 630 (e.g., the signal 432 of FIG. 4), and a representation of a status of the data registers 632.

At the first time $t=t_1$ 602, data corresponding to a first system snapshot is sensed by the sensor system 400. For example, beginning at the first time $t=t_1$ 602 and until the second time t=$t_2$ 634, data sensed by the first sensor 610 and data sensed by the second sensor 612 correspond to the first system snapshot. Likewise, the data that is based on the first function of the first sensor and the second sensor 614 and the data that is based on the second function of the first sensor and the second sensor 616 correspond to the first system snapshot. The sensed data and the calculated data that results from the first function and the second function can be converted to digital data and stored in the one or more data registers 418a-x, from where it can be retrieved by the data retrieval block 408. Once the data corresponding to the first system snapshot has been acquired, an acquisition complete signal 608 is issued. For example, the data acquisition block 404 (e.g., the acquisition engine 406) is configured to send the signal 424 to indicate that the data snapshot acquisition 604 corresponding to a first system snapshot has completed. The signal 424 is sent to the data ready block 420, and in response to receiving the signal 424, the flag 426 of the data ready block 420 is asserted, as indicated by the representation of the data ready flag 628.

The data retrieval block 408 can initiate retrieval of the digital data based in part on identifying that the flag 426 is asserted. For example, retrieval of the digital data can be initiated once the flag 426 is asserted. As indicated by the communication activity 626, the data retrieval block 408 can poll the flag 426 to determine when data related to the snapshot is available for retrieval, and because the flag 426 is asserted, retrieval of the digital data is initiated. First, data related to the first sensor at the first time t=$t_1$ is retrieved. Referring to the representation of the data registers freeze signal 630, the initiation of data retrieval by the data retrieval block 408 causes the freeze signal 432 to be asserted, which in turn causes the one or more data registers 418a-x to be frozen, as indicated by the representations of the data stored in the first, second, third, and fourth data registers 618, 620, 622, 624.

At the second time t=$t_2$ 634, data related to the next system snapshot is acquired. Referring to the representations of the data sensed by the first and second sensors 610, 612 and the representations of the data that is based on the first and second functions 614, 616, once the new data is acquired, the first and second sensors begin sensing data corresponding to the next system snapshot, and the first function and the second function begin calculating data that is based on the next system snapshot. However, because the one or more data registers 418a-x are still frozen, the retrieval of data corresponding to the first system snapshot by the data retrieval block 408 can continue without the intermixing of data related to the next system snapshot. In particular, after the data related to the first sensor at the first time t=$t_1$ is retrieved, the representation of the communication activity 626 indicates that data related to the second sensor at the first time t=$t_1$ is subsequently retrieved. The retrieval of the data related to the second sensor at the first time t=$t_1$ is able to complete despite the new data related to the subsequent snapshot being obtained and sensed by the sensor system 400 at the second time t=$t_2$ 634. Next, the communication activity 626 indicates that data that is based on the first function at the first time is retrieved, and in turn, data that is based on the second function at the first time is retrieved (e.g., in series). Thus, the data related to the first system snapshot is kept intact even though the first and second sensors began sensing new data at the second time t=$t_2$ 634. Because the one or more data registers 418a-x are frozen, as indicated by the representations of the data stored in the first, second, third, and fourth data registers 618, 620, 622, 624, the new snapshot does not overwrite the previous one, and in this way the data retrieval can be completed without data consistency errors (i.e., without the intermixing of data from different system snapshots at different times). The representation of the communication activity 626 illustrates one example of the order in which data can be retrieved, but it should be understood that other orders are also possible. For example, data that is based on the first and/or second functions at the first time may be retrieved before data related to the first and/or second sensor at the first time t=$t_1$ is retrieved.

Once data retrieval of the data related to the first system snapshot is completed, the data ready block 420 is configured to de-assert the flag 426, as indicated by the representation of the data ready flag 628. As indicated by the representation of the communication activity 626, the data retrieval block 408 can issue a command to the data ready block 420 to cause the flag 426 to be de-asserted after data retrieval has completed. In response to the flag 426 being de-asserted, the data freeze block 422 is configured to de-assert the signal 432 to the data acquisition block 404, as indicated by the representation of the data registers freeze signal 630, thereby re-enabling updating of the one or more data registers 418a-x. Once the one or more data registers 418a-x are unfrozen, as indicated by the representation of the status of the one or more data registers 632, the sensor system 400 can acquire and store the next system snapshot.

Figure 7:
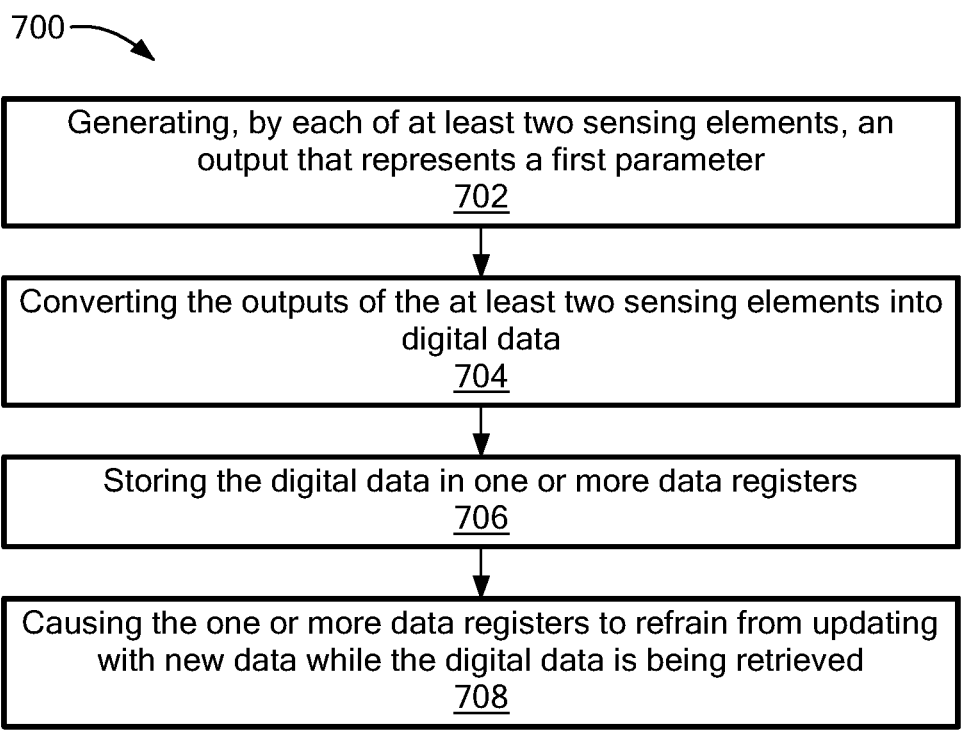
FIG. 7 is a flowchart illustrating an example process for ensuring data consistency.

FIG. 7 shows a flowchart 700 illustrating an example process for ensuring data consistency. For example, the process may be performed by the sensor system 400 of FIG. 4. At step 702, each of at least two sensing elements is configured to generate an output that represents a first parameter of the system. In some implementations, the at least two sensing elements are configured to sense one or more characteristics of a magnetic field and generate magnetic field signals based on the sensed characteristics. The magnetic field signals can be indicative of a position, orientation, and/or motion of a proximate object in proximity to the magnetic field. In some implementations, the magnetic field signals can undergo front end processing to amplify and/or otherwise modify the magnetic field signals before being converted to digital data.

At step 704, outputs or processed outputs of the at least two sensing elements are converted into digital data. At step 706, the digital data is stored in one or more data registers. In some implementations, a combination of outputs of at least two sensing elements represents a second parameter associated with the system. Further, the combination of the outputs is converted into digital data and stored in the one or more data registers. In some implementations, the first parameter associated with the system may be a strength of a magnetic field in a respective axis, and the second parameter associated with the system may be an angle of the magnetic field. In some implementations, step 702, 704, and 706 can be executed in a loop, such that the process advances from 702, to 704, to 706, and back to 702 in a continuous fashion. The continuous looping can occur until the start of the data retrieval is detected; at that point, the loop is stopped, and the process continues to step 708, as described in more detail below.

At step 708, the one or more data registers are prevented from updating with new data while the digital data is being retrieved. In some implementations, the process can include identifying when the digital data stored in the one or more data registers is available for retrieval. In some implementations, the digital data stored in the one or more data registers can be identified as being available for retrieval based on a received signal, and the received signal can cause a flag to be asserted. For example, the data ready block 420 can be configured to identify when the digital data is available for retrieval based on an acquisition complete signal received from the data acquisition block 404. The acquisition complete signal can be sent when data related to a snapshot associated with the system is acquired and stored in the one or more data registers 418a-x, ready to be retrieved by the data retrieval block 408. The acquisition complete signal can cause the flag 426 of the data ready block 420 to be asserted. The data retrieval block 408 can initiate retrieval of the digital data based in part on identifying that the flag 426 is asserted. In some implementations, the digital data is retrieved through a serial communication interface.

The process includes monitoring for initiation of retrieval of the digital data. For example, the data freeze block 422 can monitor for initiation of retrieval of the digital data by the data retrieval block 408. In response to identifying that the retrieval of the digital data has been initiated, a freeze signal can be asserted to cause the one or more data registers to refrain from updating. For example, the freeze block 422 can assert the freeze signal (e.g., the signal 432 of FIG. 4) to the data acquisition block 404 causing the one or more data registers 418a-x to refrain from updating.

In some implementations, the process includes de-asserting the flag in response to the retrieval of the digital data stored in the one or more data registers being completed. For example, the data ready block 420 can de-assert the flag in response to the data retrieval block 408 completing retrieval of the digital data stored in the one or more data register 418a-x. In some implementations, the data retrieval block 408 can execute a write to the data ready block 420 to cause the flag 426 to be de-asserted. In some implementations, the process includes de-asserting the freeze signal, to re-enable updating of the one or more data registers, in response to the flag being de-asserted. For example, the data freeze block 422 can de-assert the freeze signal to the data acquisition block 404, to re-enable updating of the one or more data registers 418a-x, in response to the flag 426 being de-asserted. Once the one or more data registers 418a-x are unfrozen, the system can proceed to capture of the next system snapshot. In this way, all digital data of interest related to the first system snapshot can be retrieved before the one or more data registers are overwritten with new data related to the next system snapshot. As such, a data consistency error (i.e., intermixing of data from different system snapshots) is prevented.

Figure 8:
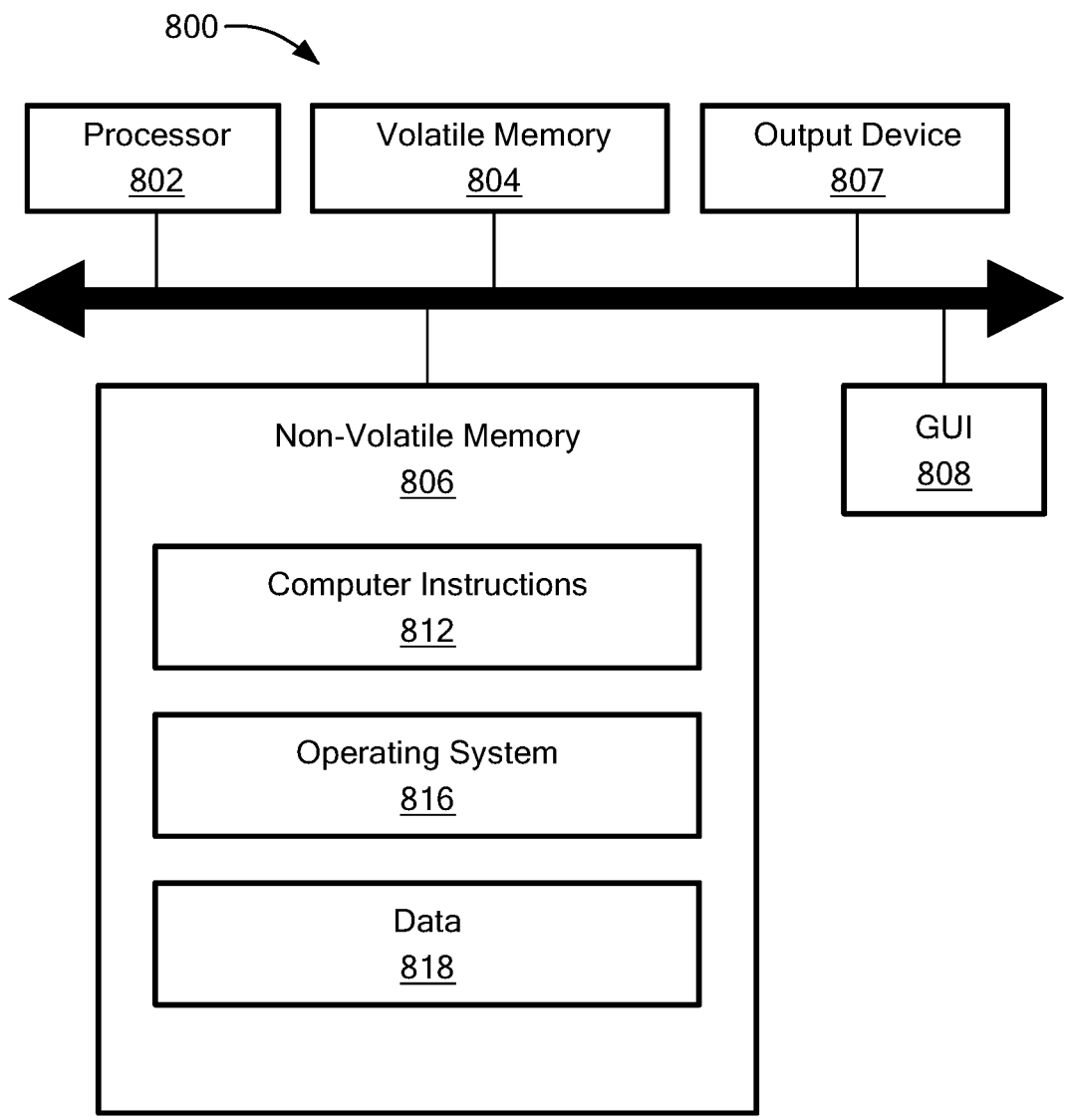
FIG. 8 is a schematic representation of an example computer system that can perform at least a portion of the processing described herein.

FIG. 8 shows a schematic representation of an example computer system 800 that can perform at least a portion of the processing described herein. For example, the computer system 800 can be used to ensure data consistency in a system (e.g., the sensor system 400 of FIG. 4) in a manner as described above. For example, the computer system 800 may be included as part of the sensor IC 401 and/or the data retrieval block 408 of FIG. 4.

The computer system 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816, and data 818. In some examples, the computer instructions 812 are executed by the processor 802 out of volatile memory 804.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The computer system 800 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the computer system 800. All or part of the computer system 800 may be implemented as, special purpose logic circuitry (e.g., an FPGA (field programmable gate array) and/or an ASIC (application-specific integrated circuit)). As used herein, circuitry refers to any implementation of hardware, firmware, and/or software that includes at least one transistor, i.e., is not per se software.

While the systems and techniques described herein have largely been described with respect to sensor systems that sense magnetic field information, it should be understood that the data consistency techniques described herein also apply to other types of sensors, including but not limited to pressure sensors, optical sensors, voltage sensors, current sensors, impedance sensors, temperature sensors, and humidity sensors, to name a few. The techniques described herein can apply to any sensor and/or system that has at least two outputs that are changing in real time. For example, the at least two sensing elements 410a-n of FIG. 4 may be configured to generate an output that represents a pressure associated with a proximate object (e.g., a diaphragm) of the sensor system 400, or generate an output that represents light associated with a proximate object.

In some implementations, the at least two sensing elements 410a-n of FIG. 4 are magnetic field sensing elements configured to sense a magnetic field. The magnetic field sensing elements can be, but are not limited to, Hall effect elements, magnetoresistance elements, inductive elements, and magnetotransistors. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). Depending on the device type and other application requirements, the magnetic field sensing elements may be devices made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

In some implementations, the sensor IC 401 of FIG. 4 may be referred to as a "magnetic field sensor." As used herein, the term magnetic field sensor is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A sensor system comprising:
a signal sensing block comprising at least two sensing elements, each of the at least two sensing elements configured to generate an output that represents a first parameter associated with the sensor system;
a data acquisition block configured to convert the outputs of the at least two sensing elements into digital data for retrieval, wherein the digital data is stored in one or more data registers of the data acquisition block;
a data ready block configured to identify when the digital data stored in the one or more data registers is available for retrieval, wherein the data ready block is configured to identify, by assertion of a data-ready flag, when the digital data is available for retrieval based on a signal received from the data acquisition block;
a data retrieval block configured to retrieve digital data from the data acquisition block, wherein the data retrieval block is configured to initiate retrieval of the digital data based in part on identifying that the data-ready flag is asserted; and
a data freeze block configured to cause the one or more data registers to refrain from updating with new data while the data retrieval block is retrieving the stored digital data,
wherein the data freeze block is configured to monitor for initiation of retrieval of the digital data, and in response to identifying that the retrieval of the digital data has been initiated, assert a freeze signal to the data acquisition block causing the one or more data registers to refrain from updating.

2. The sensor system of claim 1, wherein a combination of the outputs of the at least two sensing elements represents a second parameter associated with the sensor system, and the data acquisition block is further configured to convert the combination of the outputs of the at least two sensing elements into the digital data.

3. The sensor system of claim 2, wherein the output of each of the at least two sensing elements represents the first parameter at a particular time, and the combination of the outputs from the at least two sensing elements represents the second parameter at the particular time.

4. The sensor system of claim 1, wherein the data retrieval block is configured to retrieve the digital data with a serial communication interface.

5. The sensor system of claim 1, wherein the signal sensing block, the data acquisition block, and the data freeze block are included as part of the same integrated circuit package.

6. The sensor system of claim 1, wherein the data ready block is configured to de-assert the data-ready flag in response to the data retrieval block completing retrieval of the digital data stored in the one or more data registers.

7. The sensor system of claim 1, wherein the data freeze block is configured to de-assert the freeze signal to the data acquisition block, to re-enable updating of the one or more data registers, in response to the data-ready flag being de-asserted.

8. The sensor system of claim 1, wherein the data retrieval block is part of an Engine Control Unit (ECU).

9. The sensor system of claim 1, wherein each of the at least two sensing elements of the signal sensing block comprises at least one magnetic field sensing element for sensing a magnetic field affected by movement of a proximate object.

10. The sensor system of claim 2, wherein the first parameter comprises a strength of a magnetic field in a respective axis and the second parameter comprises an angle of the magnetic field.

11. A method comprising:
generating, by each of at least two sensing elements, an output that represents a first parameter;
converting the outputs of the at least two sensing elements into digital data, and storing the digital data in one or more data registers;
identifying when the digital data stored in the one or more data registers is available for retrieval, wherein the digital data stored in the one or more data registers is identified as being available for retrieval based on a received signal, and the received signal causes a data-ready flag to be asserted;
initiating retrieval of the digital data based in part on identifying that the data-ready flag is asserted;

monitoring for initiation of retrieval of the digital data;

in response to identifying that the retrieval of the digital data has been initiated, asserting a freeze signal; and in response to the data freeze signal, causing the one or more data registers to refrain from updating with new data while the stored digital data is being retrieved.

12. The method of claim 11, further comprising converting a combination of the outputs of the at least two sensing elements into the digital data, wherein the combination of the outputs of the at least two sensing elements represents a second parameter.

13. The method of claim 11, further comprising:
de-asserting the data-ready flag in response to the retrieval of the digital data stored in the one or more data registers being completed.

14. The method of claim 13, further comprising:
de-asserting the freeze signal, to re-enable updating of the one or more data registers, in response to the flag being de-asserted.

15. The method of claim 12, wherein the first parameter comprises a strength of a magnetic field in a respective axis and the second parameter comprises an angle of the magnetic field.

* * * * *

UNITED STATES PATENT AND TRADEMARK OFFICE
CERTIFICATE OF CORRECTION

PATENT NO. : 12,061,937 B2
APPLICATION NO. : 17/846455
DATED : August 13, 2024
INVENTOR(S) : Ricardo Scheinkerman Page 1 of 1

It is certified that error appears in the above-identified patent and that said Letters Patent is hereby corrected as shown below:

In the Specification

Column 9, Line 47, delete "Fc" and replace with --$I^2C$--.

Signed and Sealed this
Thirtieth Day of September, 2025

John A. Squires
*Director of the United States Patent and Trademark Office*